United States Patent [19]

Burgmeier et al.

[11] Patent Number: 4,688,226
[45] Date of Patent: Aug. 18, 1987

[54] CODE ERROR OVERLAYING IN DIGITAL TRANSMISSION SIGNALS

[75] Inventors: Juergen Burgmeier, Munich; Josef Doemer, Hohenschaeftlarn, both of Fed. Rep. of Germany

[73] Assignee: Siemens Aktiengesellschaft, Berlin & Munich, Fed. Rep. of Germany

[21] Appl. No.: 730,449

[22] Filed: May 6, 1985

[30] Foreign Application Priority Data

May 8, 1984 [DE] Fed. Rep. of Germany ....... 3416953

[51] Int. Cl.$^4$ ............................................. G06F 11/00
[52] U.S. Cl. ................................. 371/57; 340/347 DD
[58] Field of Search .......................... 371/5, 6, 56, 57; 375/17, 19; 340/347 DD

[56] References Cited

U.S. PATENT DOCUMENTS 4,092,595 5/1978 Weir et al. ............................. 375/17
4,177,447 12/1979 Jaouen ................................... 371/57

FOREIGN PATENT DOCUMENTS 0045680 2/1982 European Pat. Off. .
2944377 5/1981 Fed. Rep. of Germany .
3004767 5/1981 Fed. Rep. of Germany .
3117221 2/1983 Fed. Rep. of Germany .

Primary Examiner—Charles E. Atkinson
Attorney, Agent, or Firm—Hill, Van Santen, Steadman & Simpson

[57] ABSTRACT

For checking transmission and monitoring devices of digital transmission links, it is known to overlay code errors into the digital signals to be transmitted. In accordance with the invention, the code errors are overlaid such that given the prerequisite of a redundant transmission code, no falsification of the informational content of the digital signals arises. In accordance with the invention, this is undertaken in that the mode condition in the connected mode memory is modified and output to the mode input of the code conversion logic as a new sequential mode.

11 Claims, 9 Drawing Figures

CODE ERROR OVERLAYING IN DIGITAL TRANSMISSION SIGNALS

BACKGROUND OF THE INVENTION

The invention relates to a method for code error overlaying in digital transmission signals which are transformed before transmission via a digital link and a redundant alphabet code having a plurality of modes.

A monitoring of the transmitted digital signal in digital signal transmission links with respect to a specific monitoring criterion, for example synchronous information of digital signals or a coding rule, is undertaken via, for example, a running digital sum in terminals, and under given conditions, in intermediate regenerators as known from German AS No. 3004767, incorporated herein by reference. Due to a low error rate of transmission links for digital signals such as below $10^{-10}$ errors per bit, and due to the possibility that occurring errors do not lead to infractions of the coding rule, errors are mixed into the digital signals to be transmitted to a certain extent by a terminal, the monitoring criterion being intentionally falsified by these errors. As a consequence of the low error rate in digital transmission systems, it is possible to introduce easily identifiable code errors into the digital signals to be transmitted without a significant falsification of the informational content of these signals appearing. For situations in which a noticeably higher error rate is mixed in, the known method is thus unsuitable. Such possibilities are, for example, desirable in digital transmission links where possibilities of error multiplication are established due to the employment of scramblers and alphabet codes.

German Letters Patent No. 2944377, incorporated herein by reference, discloses a line terminal connected to a digital interface DS which, following the digital interface, comprises a series connection of a receive interface EI, a transmit-side code converter CUS, and a transmission amplifier, to which a line interface LS is connected. At the receive side following the line interface LS, the line terminal comprises a receiving amplifier EV, a receive-side code converter CUE, and a transmit interface SI to which a digital interface DS is in turn connected. The exchange-side interface signal is converted into a binary signal in the receive interface EI, is transformed into an alphabet code in the transmit-side code converter, for example in accordance with a 5B 6B conversion or a 4B 3T conversion, and is set to the correct pulse shape at the desired level in the transmit amplifier. The code tables employed for the conversion comprise a plurality of modes. In accordance with previous history, it is thus possible to allocate one of a plurality of secondary values to a primary value. Depending on the mode, the secondary values can be different, but identical secondary values in different modes are always allocated to one and the same primary value.

The table for such a code is shown in German AS No. 31 17 221, and which has been incorporated herein as FIG. 9.

The description of this table shown in FIG. 9 herewith and incorporated from the aforementioned German Patent is as follows.

FIG. 9 shows a table of the 32 possible, different code words of five binary digits that the input signal can assume. The running numbers 0 through 31 indicate the respective amplitude level. Following the five-bit words, the six-bit words of the output signal are shown in positive and in negative mode, these being output as a result of the conversion. The amplitude levels corresponding to the six-bit words and the two sequential modes are also shown. As already mentioned above, the six-bit words can appear in the positive or in the negative mode and are controlled by the running digital sum. The sequence of the five-bit words and of the six-bit words is indicated with A B C . . . , where A is respectively read in or output first. It turns out that the 32 possible amplitude values of the input signal can be divided into two ranges of equal size, whereby the one range covers the amplitude values from 0 through 15 and the other range covers the amplitude values 16 through 31.

The allocation between the six-bit words and the five-bit words in the first range has been selected such that the greatest possible coincidence between the input signal and output signal respectively derives when the first place of the six-bit word is not taken into consideration. Not only a simple but also a fast allocation in the occurring amplitude ranges is thus assured.

In view of such a simple construction while avoiding involved read-only memories, the allocation for the second range has thus been selected such that the code word for the positive mode for the lowest amplitude value of the second range corresponds to the inverted code word of the negative mode of the highest amplitude value of the first range. Binarily expressed, the code word corresponding to the amplitude value 49 represents the inverted code word for the amplitude value 14. Since the code words for the positive and negative mode are the same given the highest amplitude value of the first range, they are likewise the same for the lowest amplitude value of the second range as well.

For the second-lowest amplitude value of the second range, the code word 57 for the positive mode corresponds to the inverted code word 6 of the negative mode of the second-highest amplitude value of the first range. Furthermore, the code word 17 for the negative mode corresponds to the inverted code word 46 of the positive mode of the second-highest amplitude value of the first range. Given the assumption of a symmetry line between the amplitude values 15 and 16 of the five-bit word and the corresponding values of the six-bit word, the table of FIG. 9 is thus symmetrical, and diagonally inverted. Accordingly, the code word 19 for the fourth-highest amplitude value of the second range is the same as the inverted code word 44 for the negative mode of the fourth-highest amplitude value of the first range. Since the code words 44 for the positive and negative mode are also the same in this case in the first range, they are also the same for the fourth-lowest amplitude value of the second range. Finally, the code word for the positive mode of the highest amplitude value of the second range is the same as the inverted code word of the negative mode of the lowest amplitude value of the first range. Given the lowest amplitude value of the first range, the code words for the positive and for the negative mode are the same, so that they are likewise the same for the highest amplitude of the second range.

At the receive side, the conversion of the six-digit binary words back into five-digit binary words occurs upon application of the same allocation in a correspondingly reverse direction.

In the re-conversion at the receive side, the problem can occur that a falsification of the originally transmitted six-bit word occurs in the transmission due to a disturbance. Given the assumption that only a single bit was falsified, various consequences are possible. It can turn out that not one bit but a plurality of bits are falsified after the conversion, and it can also turn out that no bit is falsified. Thus, a code word that was not originally employed can also have arisen. The error multiplication factor for the allocation according to the table of FIG. 9 amounts to 1.28 bits on the average. The error multiplication is thus very slight by comparison.

The construction of the allocations in accordance with the table of FIG. 9 can be a combinatorial network optimized in accordance with known means with gates and controllable inverters in an LSI circuit, for example in what is referred to as a mask-programmable logic module of series SH100.

At the receive side, the line terminal of German Patent No. 2944377, incorporated herein by reference, contains a receive amplifier EV which can be a regenerator for digital signals transmitted via copper line links. It can also be a photo-amplifier in case a link conducted via light waveguides follows the line interface. The reconversion of alphabet code into a binary signal occurs in a receive-side code converter CUE. This binary signal is transformed in the transmit interface SI into the interface code and is output with the prescribed level to the digital interface DS. To this extent, FIG. 1 of the present patent application corresponds to FIG. 1 of the German Patent No. 2944377, incorporated herein by reference.

SUMMARY OF THE INVENTION

An object of the present invention is to find a possibility for code error overlaying which is employable in digital transmission links with an alphabet coder as a link code, and which does not cause any falsification of the informational content of the transmitted, digital signal even at a high code error rate.

This object is achieved in accordance with the invention by employing for code conversion of at least one word of the transmission signals a mode condition modified in comparison to a provided mode condition.

BRIEF DESCRIPTION OF THE DRAWINGS

FIG. 9 is a table for conversion of five-bit words into six-bit words.

DESCRIPTION OF THE PREFERRED EMBODIMENTS

Figure 1:
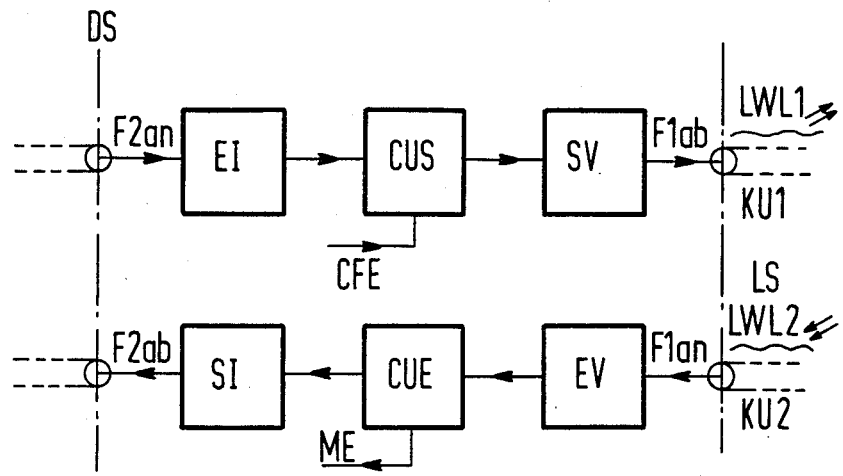
FIG. 1 is a block diagram of a line terminal of a digital transmission link.

Except for additional connections CFE for a signal for code error overlaying at the transmit-side code converter and ME for a monitor input connected to the receive-side code converter CUE, FIG. 1 corresponds to the prior art already described. Depending on the use, an outgoing and an incoming light waveguide transmission link LWL 1, LWL 2, or an outgoing and an incoming copper line link KU 1, KU 2 can be connected to the line interface LS.

Figure 2:
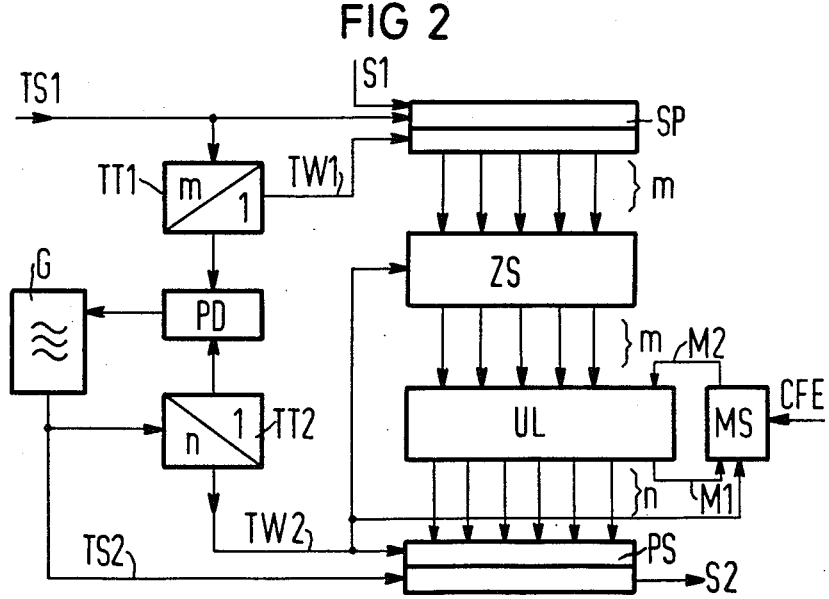
FIG. 2 is a block diagram of a transmit-side code converter.

The block diagram in FIG. 2 shows a code converter useful as a transmit-side code converter CUS in the line equipment of FIG. 1. Except for the mode memory MS and the corresponding connections, the code converter corresponds to the prior art as disclosed in German Patent No. 2944377, column 4, beginning with line 38, all incorporated herein by reference. For the word-by-word conversion of the incoming signals S1, these are parallelized based on first bit clock TS1 in a first serial-to-parallel converter SP 1 and are output to an intermediate memory ZS under the influence of a first word clock TW1 acquired from the first bit clock TS1 by a clock divider TT1. The code converter contains a phase control loop having a receive-side generator G which oscillates at the bit clock frequency of the outgoing signals. The second word clock is generated from this bit clock by a second frequency divider TT2 and is output to the intermediate memory ZS as well as to a phase discriminator PD. This phase discriminator also receives the first word clock TW1 from the first clock divider TT1. Since the word clocks are identical in terms of frequency, a phase comparison is possible. The result of the phase comparison serves for controlling the generator G. The second word clock TW2, just like the second bit clock TS2, is practically jitter-free, so that the signal values stored in the intermediate memory ZS are readout jitter-free and output to the code conversion logic UL. The code conversion logic is read-only memory ROM with additional mode recognition which, in response to an incoming 5-bit word, outputs the allocated 6-bit word to the parallel-to-serial converter PS from which the output signal S2 is output to the following transmit amplifier SV. With the code converter of FIG. 2, a code word having m bits generates a code word having n bits which is comparatively jitter-free.

In accordance with the invention, FIG. 2 additionally contains a mode memory MS synchronized with the second word clock TW2 and which has a control input CFE at its command to which pulses can be applied for code error overlaying into the outgoing signals. The mode memory MS is connected via an output Q to an allocated mode input M2 of the code conversion logic UL and emits a signal corresponding to mode condition to code conversion logic mode input M2. This signal switches the code conversion logic into a "false" mode condition given code error overlays, or prevents switching into the next "correct" mode condition (see FIG. 9). In accordance with the mode condition and code word accepted by the intermediate memory ZS, the code conversion logic generates an output word and a signal corresponding to a sequential mode is output via the code conversion logic mode output M1 to a connected input D of the mode memory MS. The code conversion with a corresponding code table is known from FIG. 9 taken from German OS No. 31117221 and discussed previously. The resulting output code word in the code error overlaying is not the code word provided in accordance with the code table, but a code word that corresponds to the false sequential mode. When, for example, a 5-bit word having the form 00010 is input, then the output word 110110 given a positive sequential mode and the code word 100010 given a negative sequential mode are possible. The two output words appear in the code table only in the allocation to the input word 00010. When, instead of the correct positive mode, the code word is output in accordance with the negative mode, then this is perceptible at the receive side as a code error, but a clear allocation to the 5-bit code word 00010 is possible so that the overlaying and transmission of a code error does not lead to a falsification of the transmitted information.

Figure 3:
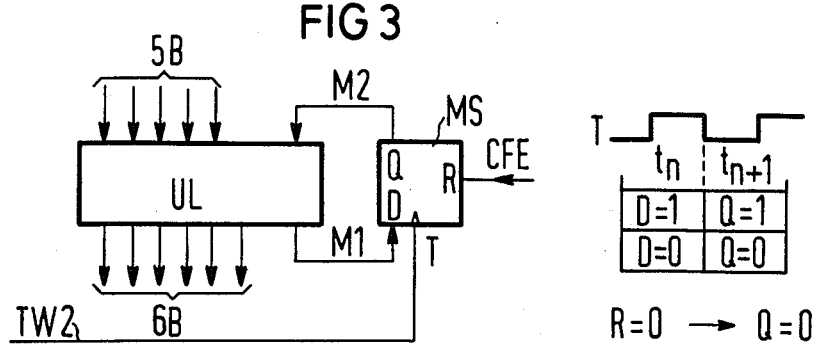
FIG. 3 is a part of the transmit-side code converter with a simple mode memory.

FIG. 3 shows the code conversion logic in interaction with a D-flip-flop that serves as a mode memory MS. The code conversion logic UL serves for the transformation of a 5-bit word into a 6-bit word. The D-flip-flop employed as a mode memory MS has its D-input connected to the mode output M1 of the code conversion logic UL. The Q-output of the flip-flop is connected to the mode input M2 of the code conversion logic UL. The D-flip-flop is clocked with the word clock TW2 of the 6-bit words and also contains a reset input R connected to the input of the code error overlayer CFE. When, for example, the code conversion logic UL outputs a positive output signal to the D-input for signalling the positive mode condition, then the corresponding Q-output of the D-flip-flop likewise proceeds to the value logical 1 and forwards this to the mode input M2 of the code conversion logic. A pulse for code error overlaying at the reset input R of the D-flip-flop sets this to zero and the negative mode condition now proceeds to the mode input M2 instead of the positive mode condition.

Figure 4:
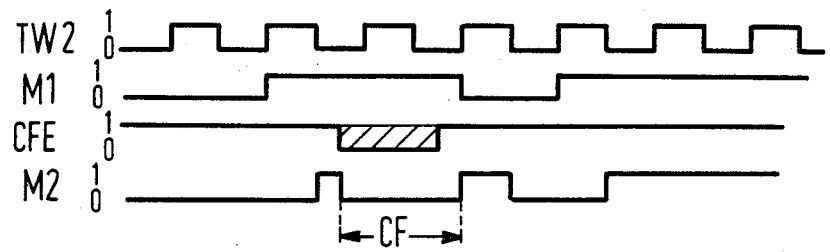
FIG. 4 is a pulse diagram relating to FIG. 3.

The code error overlaying is explained in greater detail in FIG. 4 in a pulse diagram relating to FIG. 3. Shown below one another are the word clock TW2 for the 6-bit words to be generated, the mode condition at the mode output M1 of the code conversion logic, a reset pulse at the input to the code error overlayer, and the logical status at the mode input M2 of the code conversion logic. Since the mode condition does not change with every 6-bit word, the M1 pulses are of comparatively longer duration than the pulses of the second word clock signal TW2.

It was assumed in the present case that the mode condition at the mode output of the code conversion logic changes from zero to one with the second word clock pulse, and remains one for two word clock periods. With the end of the second word clock pulse, the D-flip-flop is switched, so that the logical "1" level likewise appears at its Q-output. When, as indicated in the illustrative embodiment, the D-flip-flop is reset at a certain time thereafter via a pulse at the reset input R, then the logical status at the Q-output returns to zero, so that the mode condition at the mode input M2 of the code conversion logic UL is disturbed, and thus a code error is generated, but not a bit error. The frequency of code errors can be selected via the number of control pulses at the reset input of the second memory MS. It is expedient, for example, to set a code error frequency of about $10^{-5}$ which lies between the two limits for the urgent alarm corresponding to an error frequency of $10^{-3}$ and the non-urgent alarm corresponding to an error frequency of $10^{-4}$. The setting of an error rate of $10^{-5}$ is then recognized in the receiving line terminal equipment as a non-urgent (B) alarm.

Figure 5:
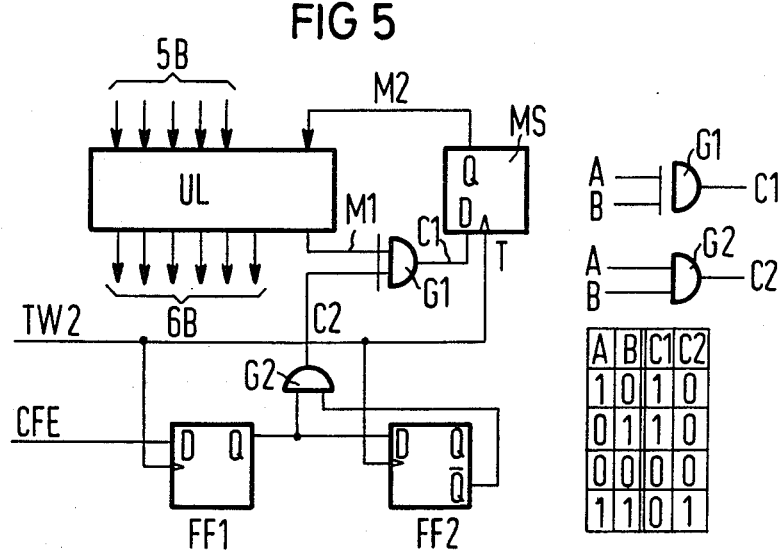
FIG. 5 is a part of the transmit-side code converter with a more involved mode memory for a 5B/6B coding.

A more involved type of code error overlaying is provided in the arrangement of FIG. 5 wherein one code error is generated at every positive mode change.

Figure 6:
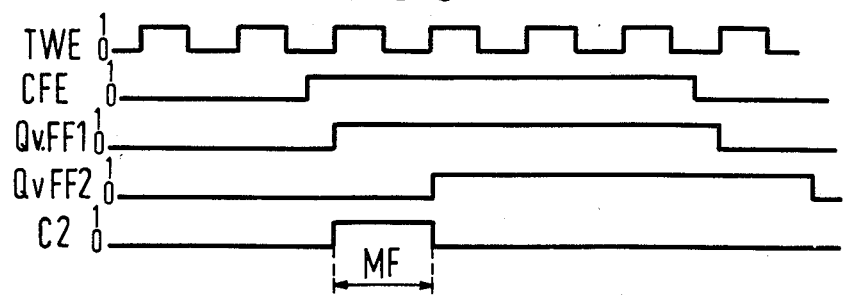
FIG. 6 is a pulse diagram relating to FIG. 5.

In FIG. 5, a first gate G1 is inserted into the connection from the mode output M1 of the code conversion logic to the D-input of the mode memory MS. In accordance with the logic table, this is a matter of an exclusive-OR gate whose one input is connected to the mode output M1 and whose other input is connected to the output of a second gate G2 of the AND type. As in the case of FIG. 3, the mode memory is clocked with the second word clock TW2, but the input CFE for the pulses that initiate the code error overlaying is no longer connected to the mode memory but to the D-input of a first D-flip-flop FF1. This flip-flop is likewise clocked with the second word clock TW2. It thus acts as a memory for the pulses for code error overlaying and forwards these via its Q-output to the first input of the second gate G2 and to the D-input of a second D-flip-flop FF2. The inverting output $\overline{Q}$ of this second D-flip-flop FF2 is connected to the second input of the second gate G2. The second D-flip-flop FF2 is also clocked with the second word clock TW2. The behavior of the arrangement is shown dependent on the input signals in FIG. 6. Shown under the second word clock TW2 in FIG. 6 is a pulse for code error overlaying lasting a plurality of word clock periods whose logical level appears with the next leading clock edge at the output Q of the flip-flop FF1 and with the second leading clock edge at the output Q of the second D-flip-flop FF2. The output signals of the non-inverting output Q of the first D-flip-flop FF1 and of the inverting output $\overline{Q}$ of the second D-flip-flop FF2 are combined with the gate G2, so that a 1-pulse appears at the output C2 of the second gate G2 with the appearance of the logical 1 at the non-inverting output of the first D-flip-flop FF1, this 1-pulse lasting until the beginning of the second clock edge after the appearance of the pulse for code error overlaying CFE. This results from the two 1-pulses at the inputs of the first gate G1 which emits a zero pulse to the mode memory and modifies the mode condition for a word clock period. One code error thus results per positive pulse change insofar as the length of the control pulse is greater than a word clock period. The infraction of the running digital sum, monitored as a coding rule infraction in a positive or negative direction, occurs statistically dependent on the condition at the mode output M1 of the code conversion logic UL during the disturbed word clock period since this condition is negated.

Figure 7:
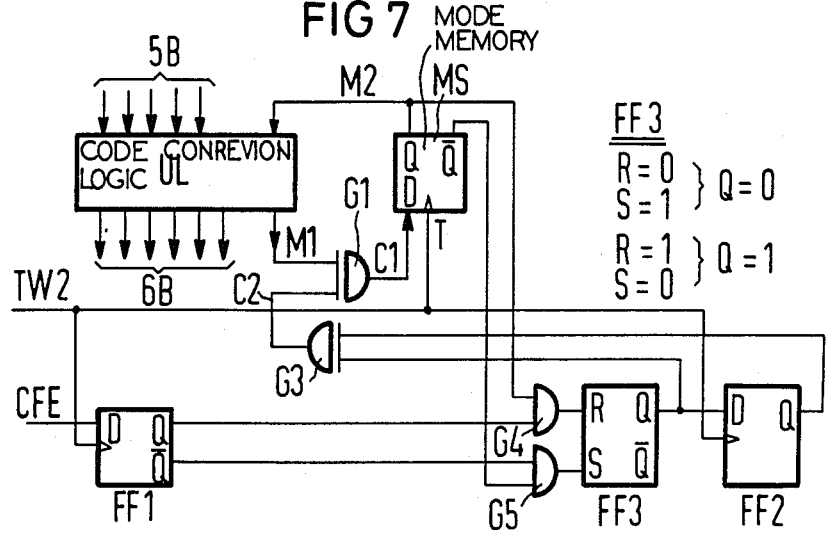
FIG. 7 is a part of the transmit-side code converter with an even more involved mode memory for a 5B/6B coding.

In comparison to the arrangement of FIG. 5, the "yield" of code errors is higher given the arrangement of FIG. 7, since one code error arises at every positive and at every negative trigger pulse change, whereby, however, the expense is again increased. As in FIG. 5, the mode output M1 of the code conversion logic UL in FIG. 7 is connected via the first gate G1 to the D-input of a D-flip-flop clocked with the word clock TW2, this acting as mode memory MS, and its non-inverting output Q being connected to the mode input M2 of the code conversion logic UL. The D-input of the first D-flip-flop is connected to the input for the pulses CFE for code error overlaying, this first D-flip-flop being likewise clocked with the word clock TW2. The rest of the circuit, however, is different. The second input of the first gate G1 of the exclusive-OR type is connected to the output of a third gate G3 which is likewise a matter of an exclusive-OR gate. The non-inverting output Q and the inverting output $\overline{Q}$ of the first flip-flop FF1 are respectively separately connected to first inputs of a fourth and of a fifth gate G4, G5 of the AND type. The second input of the fourth gate G4 is connected to the non-inverting output Q of the mode memory MS. The second input of the fifth gate G5 is connected to the inverting output $\overline{Q}$ thereof. The output of the fourth gate G4 is connected to the reset input R and the output of the fifth gate G5 is connected to the setting input S of a third flip-flop FF3 which is an RS-flip-flop. The non-inverting output Q of this flip-flop is connected to the one input of the third gate and to the D-input of the second D-flip-flop FF2 clocked with the word clock TW2 and whose non-inverting output Q is connected to the second input of the third gate G3.

Figure 8:
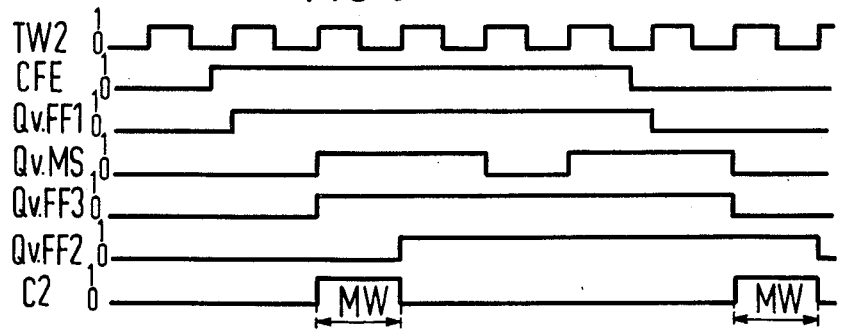
FIG. 8 is a pulse diagram relating to FIG. 7.

The pulse diagram to FIG. 7 is shown in FIG. 8, this again showing the second word clock TW2 in the top line and a pulse CFE for code error overlaying therebelow. With the next leading clock edge, the non-inverting output Q of the first D-flip-flop FF1 is set to 1 after the beginning of the pulse CFE. The condition at the output Q is first dependent on the previous history, i.e. on the preceding mode conditions in the code conversion logic UL. Since the mode memory MS is clocked with the second word clock TW2 and switches at a leading edge, its logical status can only change with the leading edge of the word clock. This case has been assumed one clock edge after the switching of the first D-flip-flop FF1. The non-inverting output Q of the mode memory MS, and thus the condition at the mode input of the code conversion logic, then switches via the fourth or the fifth gate G4, G5. The RS-flip-flop FF3 also switches so that its non-inverting output Q is switched to the value logical 1. One clock edge later, the second D-flip-flop whose D input is connected to the Q output of the RS-flip-flop switches. Via the third gate G3, the status at the Q output of the second D-flip-flop FF2 is forwarded to the first gate G1 and, via this, to the D input of the mode memory, so that it is switched one clock edge later. Regions MV of disturbed mode change respectively lying between the switching of the RS-flip-flop and of the second D-flip-flop result at the output C2 of the gate G3 during this time. An analogous behavior results at the end of the pulse CFE for code error overlaying, but in the opposite direction. Thus, after a positive infraction of the running digital sum after the beginning of the pulse CFE for code error overlaying, a negative infraction of the running digital sum correspondingly results at the end of the pulse. Given a succession or string of such pulses for code error overlaying, positive and negative infractions of the running digital sum alternately result. The mean dc value of the digital signal is thus preserved. The number of code errors per time unit can thus assume the highest value without falsification of the transmitted digital information thus arising. Given a correspondingly high bit rate of the digital signal to be transmitted as well as a correspondingly high number of code errors, it is possible to transmit not only relatively slow telemetry signals or other data signals, but on the basis of the described code error overlaying, it is also possible to transmit a complete voice channel which, for example, can be employed as a service channel and for link or route switching.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for overlaying code errors into digital transmission signals which are converted into a redundant alphabet code with a plurality of modes before transmission over a digital path, comprising the steps of:
   receiving digital transmission signals in a first code;
   deriving a first bit clock and a first word clock from the received signals;
   performing a series-to-parallel conversion of the received signals;
   inputting the received signals word-by-word as parallel digital signals into an intermediate memory by use of the first word clock;
   generating a second bit clock and a second word clock;
   reading out word-by-word parallel digital signals from the intermediate memory to a recoding code conversion logic by use of the second word clock;
   inputting externally generated control pulses into a mode memory connected to the code conversion logic and for initiating code error overlaying with the code conversion logic;
   outputting a signal corresponding to a mode condition from the mode memory to the recoding code conversion logic;
   reading out word-by-word recoded digital signals from the recoding code conversion logic by use of the second word clock given simultaneous identification of a running digital sum of the recoded digital signals;
   outputting a signal corresponding to sequential mode from the recoding code conversion logic to the mode memory;
   converting the recoded digital signals from parallel-to-serial form; and
   outputting the recoded digital signals bit-by-bit by use of the second bit clock.

2. A method according to claim 1 including the step of setting the mode condition to a value deviating from a code table associated with the code conversion logic.

3. A method according to claim 1 including the step of storing the mode condition beyond a given time.

4. A method according to claim 1 including the step of changing the mode condition after two code words.

5. A method according to claim 1 including the step of transmitting additional information by a transmit-side overlaying and a receive-side code error recognition.

6. A method according to claim 5 including the step of providing said additional information as telemetry signals which describe a condition of the digital path for the digital signals.

7. A method according to claim 5 including the step of providing said additional information as voice signals.

8. A code converter system for code error overlaying into digital transmission signals transformed into a redundant alphabet code having a plurality of modes before transmission via a digital link, comprising:
   a mode memory means;
   code conversion logic means connected to the mode memory means for transforming a word of said digital transmission signals, said code conversion logic means containing a mode output at which a signal identifying a sequential mode is output to said mode memory means, and a mode input for receiving a signal corresponding to mode condition from said mode memory means;
   said mode memory means comprising a D-flip-flop clocked with a word clock means for clocking digital output signals from the code converter system, a D input connected to said code conversion logic means mode output and a Q output connected to said code conversion logic means mode input;

said mode memory means having an input connected to receive pulses for directing code error overlaying;

a serial/parallel converter connecting through an intermediate memory to the code conversion logic means; and a parallel/serial converter connecting to the code conversion logic means and to said word clock means and having an output at which said digital output signals are present.

9. A code converter system according to claim 8 wherein an exclusive-OR first gate is provided between the mode output of the code conversion logic means and the D-input of the mode memory means, one input of said first gate being connected to the mode output and a second input thereof being connected to an output of an AND second gate;

said mode memory means input directing code error overlaying being directly connected to a D-input of a first D-flip-flop whose non-inverting output is connected to one input of the second gate as well as to a D-input of a second D-flip-flop whose inverting output Q is connected to another input of the second gate; and the first and the second D-flip-flop being connected to a word clock source for the digital output signals.

10. A code converter system according to claim 8 including the steps of:

providing an exclusive-OR first gate between the mode output of the code conversion logic means and the D-input of the mode memory means, one input of said first gate being connected to the mode output and the other input thereof being connected to an output of an exclusive-OR third gate;

the mode memory means code error overlaying pulse input being connected to a D-input of a first D-flip-flop;

a non-inverting Q and inverting $\overline{Q}$ output of said first D-flip-flop being respectively separately connected to the first inputs of fourth and fifth AND gates;

a second input of the fourth gate being connected to a non-inverting output Q of the mode memory means and a second input of the fifth gate being connected to an inverting output $\overline{Q}$ of the mode memory means;

an output of the fourth gate being connected to a reset input and an output of the fifth gate being connected to a setting input of a third flip-flop;

a non-inverting output Q thereof being connected to one input of the third gate as well as to a D input of the second D-flip-flop;

a non-inverting output Q of the second D-flip-flop being connected to another input of the third gate; and the first and the second D-flip-flops being connected to a word clock source for the re-coded digital signals.

11. A code converter system for code error overlaying, comprising:

a mode memory means;

code conversion logic means connected to the mode memory means for transforming a word of said digital transmission signals, said code conversion logic means containing a mode output at which a signal identifying a mode is output to said mode memory means, and a mode input for receiving a signal corresponding to mode condition from said mode memory means;

said mode memory means comprising a flip-flop connected at a first input with a word clock means for clocking digital output signals from the code converter system, a second input connected to said code conversion logic means mode output and a first output connected to said code conversion logic means mode input;

said mode memory means having a third input connected to receive pulses for directing code error overlaying;

a serial/parallel converter connecting to the code conversion logic means; and a parallel/serial converter connecting to the code conversion logic means and to said word clock means and having an output at which said digital output signals are present.

* * * * *